3,589,858
INHIBITING THE CORROSION OF METALS IN A WATER SYSTEM
Paul H. Ralston, Bethel Park, Pa., assignor to Calgon Corporation
No Drawing. Filed Aug. 20, 1965, Ser. No. 481,421
Int. Cl. C23f 7/08, 9/02, 11/00
U.S. Cl. 21—2.7                                                        5 Claims

ABSTRACT OF THE DISCLOSURE

The corrosion of metals in a water system is inhibited by adding to the water a glassy composition consisting of 36 to 42 molar percent $P_2O_5$, 7.3 to 14.2 molar percent ZnO, 4.4 to 56.7 molar percent $K_2O$, and up to 52.3 molar percent $Na_2O$.

---

This invention relates to readily soluble phosphate glasses forming highly stable solutions and to their use as corrosion inhibitors in water systems. More specifically, it relates to potassium-sodium-zinc phosphate glasses.

The usefulness of low concentrations of sodium metaphosphate glasses in forming protective corrosion-resistant films on metal surfaces is well-known in the art. See, for example, Rice and Hatch U.S. Pat. 2,337,856. It is also known that the incorporation of zinc in a sodium metaphosphate glass will enhance its corrosion inhibiting properties. See, for example, U.S. Pats. 2,337,856, 2,539,305, 2,601,395 and particularly Hatch U.S. Pat. 3,284,368 filed Apr. 3, 1964, and entitled "Phosphate Glass Composition." Hatch discloses a phosphate glass consisting of about a 1.60:1 to 1.75:1 molar ratio of metal oxide to $P_2O_5$ where the metal oxide is $Na_2O$ and ZnO in a molar ratio of from about 3.5:1 to about 7:1. The glass disclosed by Hatch is widely used in industrial water systems as a corrosion inhibitor.

Most corrosion applications of phosphate glasses such as the Hatch glass necessitate the dissolving of the glass to form a feed solution which is slowly added to the water system. Therefore, it is important that the glass have a high rate of solution in order to avoid expensive mixing equipment, labor, large feed tanks, and long dissolution periods.

Another important characteristic of phosphate glasses for use as corrosion inhibitors is their stability; that is, the length of time that they will remain in solution without precipitating.

While the Hatch glass has been widely used commercially as a corrosion inhibitor, it is limited by its less than ideal solution rate and feed solution stability.

I have discovered that the incorporation of $K_2O$ into a sodium-zinc-phosphate glass will markedly improve the solution rate and solution stability of the glass. Surprisingly, the solution rates of my glasses are about 2–4 times greater than the $Na_2O$ glasses, and the stability of my glasses is about 5–40 times greater.

The phosphate glasses of my invention have a total metal oxide to $P_2O_5$ ratio of about 1.40:1 to about 1.75:1 (about 36 to 42 molar percent $P_2O_5$), and preferably about 1.67:1 (about 7.5 molar percent $P_2O_5$). Ratios lower than about 1.40:1 result in excessively slow solution rates, and ratios higher than 1.75:1 greatly increase the difficulties of manufacturing the glasses. Zinc oxide levels of from about 7% to 12% (preferably about 9%) by weight of the glass are required to provide the desired enhancement of the corrosion inhibitive properties of the glass. This corresponds to a zinc oxide to sodium-potassium oxide molar ratio of about 1:3.5 to 1:7 (about 7.3 to 14.2 molar percent ZnO), preferably 1:3.5 to 1:5 (about 10.4 to 13.9 molar percent ZnO when $P_2O_5$ is about 37.5 molar percent). The relative amounts of $K_2O$ and $Na_2O$ may vary from 10% to 100% $K_2O$ based on the total amount of $K_2O$ and $Na_2O$ used. (This is equivalent to about 4.4 to 56.7 molar percent $K_2O$ and up to about 52.3 molar percent $Na_2O$ when the disclosed broad $P_2O_5$ and ZnO ranges are used and equivalent to about 4.9 to 52.1 molar percent $K_2O$ and up to about 46.9 molar percent $Na_2O$ when the disclosed preferred $P_2O_5$ and ZnO ranges are used.)

I have found that the solution rate and the solution stability is related to the percent of $K_2O$ in the total amount of $K_2O$-$Na_2O$ present. However, very high $K_2O$ percentages may increase the cost of the glass and make it uneconomical for many commercial applications. I prefer about 1:3 (about 25% or more $K_2O$). (This is equivalent to about 11.0 to 56.7 molar percent $K_2O$ and up to about 42.5 molar percent $Na_2O$ when the disclosed broad $P_2O_5$ and ZnO ranges are used and to about 12.1 to 52.1 molar percent $K_2O$ and up to about 39.1 molar percent $Na_2O$ when the disclosed preferred $P_2O_5$ and ZnO ranges are used.) A preferred composition within this range is one having a molar ratio of about $$1K_2O \cdot 3Na_2O \cdot 1ZnO \cdot 3P_2O_5$$

(about 12.5 molar percent $K_2O$, about 37.5 molar percent $Na_2O$, about 12.5 molar percent ZnO, and about 37.5 molar percent $P_2O_5$).

The phosphate glasses of this invention are prepared by the dehydration of mixtures of the suitable proportions of potash, soda ash, zinc oxide, and phosphoric acid followed by fusion at about 800° C. or more. The glass is rapidly cooled as plates which may be ground to a powder if desired. It should be noted that substitution of potassium for part or all of the sodium results in a glass which fuses at a lower temperature, and is therefore less aggressive to the furnace.

I have performed numerous experiments which demonstrate the remarkable increase in solution rates and solution stability which results from the incorporation of potassium into sodium-zinc phosphate glasses.

In these experiments, I placed 6 g. of a 12–40 mesh glass composition in 50 ml. distilled water in beakers (equivalent to about 1 lb. per gal.). The solutions were stirred and the time required for the glass composition in each beaker to completely dissolve was noted. Stirring was stopped and the solutions were stored at room temperature (75° F.). When a precipitate appeared in the solution, the time that had passed since dissolution was noted as the stability time. Table I shows the results of this test upon six different phosphate compositions.

TABLE I.—SOLUTION RATES AND STABILITY

| Phosphate composition, moles | | | | MO:$P_2O_5$ (molar ratio) | Solution rate and comments | Stability time |
|---|---|---|---|---|---|---|
| $Na_2O$ | $K_2O$ | ZnO | $P_2O_5$ | | | |
| 2.6 | | 1.0 | 3.0 | 1.21:1 | 125 min., 1 g. undissolved | |
| | 2.6 | 1.0 | 3.0 | 1.21:1 | 20 min., slightly turbid | 1 hr. |
| 3.3 | | 1.0 | 3.0 | 1.44:1 | 58 min., clear | 2 hrs. |
| 2.0 | 1.3 | 1.0 | 3.0 | 1.44:1 | 25 min., clear | 10 hrs. |
| 4.0 | | 1.0 | 3.0 | 1.67:1 | 28 min., clear | 2.5 days. |
| | 3.9 | 1.1 | 3.0 | 1.67:1 | 8 min., clear | >5.5 days. |

Table I demonstrates the increased solution rates and stability times of phosphate compositions containing $K_2O$ over compositions of the same $MO:P_2O_5$ ratio containing only $Na_2O$.

Similar experiments were performed with my preferred phosphate compositions which have $MO:P_2O_5$ ratios of about 1.67:1. In these experiments 6 g. of small plates of glassy phosphates having comparable surface areas were placed in 50 ml. hard water (pH 7.7, 400 p.p.m. $CaCO_3$) at 25° C. in a beaker. The mixtures were stirred and the time required for the glass composition in each beaker to completely dissolve was recorded. Stirring was stopped and the solutions were stored at 40° F.

When a precipitate appeared in the solution, the time that had passed since dissolution was noted as the stability time. This experiment was designed to simulate conditions often encountered in commercial operations; Table II gives the results.

TABLE II

[1.67 $MO:1P_2O_5$ phosphate plates, solution rates and stability in hard water]

| Phosphate composition, moles | | | | Solution rate at 25° C. (min.) | Stability at 40° F. (days) |
| --- | --- | --- | --- | --- | --- |
| $K_2O$ | $Na_2O$ | ZnO | $P_2O_5$ | | |
|  | 4 | 1 | 3 | 170 | 0.5 |
| 1.2 | 2.8 | 1.0 | 3.0 | 61 | 2.75 |
| 2 | 2 | 1 | 3 | 73 | 20 |
| 4 |  | 1 | 3 | 22 | 40 |

Table II demonstrates that solution rate and stability are related to the percent of $K_2O$ in the total amount of $K_2O$-$Na_2O$ present.

Other experiments were performed using the same procedure used to construct Table II. In these experiments the $MO:P_2O_5$ ratio and the $K_2O$ content were varied slightly within the preferred ranges. Results of such tests are shown in Table III.

TABLE III.—SOLUTION RATES AND STABILITY—PREFERRED RANGES

| Phosphate composition, moles | | | | $Mo:P_2O_5$ (molar ratio) | Solution rate at 25° C. (min.) | Stability at 40° F. (days) |
| --- | --- | --- | --- | --- | --- | --- |
| $K_2O$ | $Na_2O$ | ZnO | $P_2O_5$ | | | |
|  | 4 | 1 | 3 | 1.67:1 | 170 | 0.5 |
| 1.1 | 3.2 | 1.1 | 3.0 | 1.8:1 | 93 | 2 |
| 1.2 | 2.8 | 1.0 | 3.0 | 1.67:1 | 61 | 2.75 |
| 1.3 | 2.9 | 0.95 | 3.0 | 1.73:1 | 42 | 4 |

Again, Table III taken together with the results of Table I illustrates that the $K_2O$ content and the $MO:P_2O_5$ ratio each influence the solution rate and the solution stability.

The phosphate compositions of this invention have been found to be very effective corrosion inhibitors when maintained in water systems in low concentrations. The exact phosphate concentration needed for effective corrosion inhibition will depend upon the particular characteristics of the system being treated: the metal used in the system, the oxygen concentration, the solution pH, temperature, flow rate, and other factors important in determining the susceptibility of a particular water system to corrosion. Very low concentrations will inhibit corrosion to a limited extent; generally, up to about 50 p.p.m. will be sufficient to effectively inhibit corrosion in most commercial water systems.

Thus, it may be seen that this invention relates to phosphate glass compositions which are readily soluble, and form highly stable solutions, and to their use as corrosion inhibitors.

I do not intend to be limited to any compositions, examples, or methods disclosed herein for illustrative purposes. My invention may be otherwise practiced and is embodied within the scope of the following claims.

I claim:

1. A method of inhibiting the corrosion of metals in a water system comprising adding to the water of said system an effective amount of a glassy composition consisting essentially of about 36 to 42 molar percent $P_2O_5$, about 7.3 to 14.2 molar percent ZnO, about 4.4 to 56.7 molar percent $K_2O$, and up to about 52.3 molar percent $Na_2O$.

2. A method of inhibiting the corrosion of metals in a water system comprising adding to the water of said system an effective amount of a glassy composition consisting essentially of about 37.5 molar percent $P_2O_5$, about 10.4 to 13.9 molar percent ZnO, about 4.9 to 52.1 molar percent $K_2O$, and up to about 46.9 molar percent $Na_2O$.

3. A method of inhibiting the corrosion of metals in a water system comprising adding to the water of said system in effective amount of a glassy composition consisting essentially of about 36 to 42 molar percent $P_2O_5$, about 7.3 to 14.2 molar percent ZnO, about 11.0 to 56.7 molar percent $K_2O$, and up to about 42.5 molar percent $Na_2O$.

4. A method of inhibiting the corrosion of metals in a water system comprising adding to the water of said system an effective amount of a glassy composition consisting essentially of about 37.5 molar percent $P_2O_5$, about 10.4 to 13.9 molar percent ZnO, about 12.1 to 52.1 molar percent $K_2O$, and up to about 39.1 molar percent $Na_2O$.

5. A method of inhibiting the corrosion of metals in a water system comprising adding to the water of said system an effective amount of a glassy composition consisting essentially of about 12.5 molar percent $K_2O$, about 37.5 molar percent $Na_2O$, about 12.5 molar percent ZnO, and about 37.5 molar percent $P_2O_5$.

References Cited

UNITED STATES PATENTS

| 2,988,439 | 6/1961 | Gloss | 23—106X |
| 2,337,856 | 12/1943 | Rice et al. | 148—6.15 |
| 2,370,473 | 2/1945 | King | 21—2.7UX |
| 3,284,368 | 11/1966 | Hatch | 21—2.7X |

ALFRED L. LEAVITT, Primary Examiner

T. E. BOKAN, Assistant Examiner

U.S. Cl. X.R.

23—106A; 106—14; 148—6.15R, 6.15Z; 252—175, 387

UNITED STATES PATENT OFFICE
CERTIFICATE OF CORRECTION

Patent No. 3,589,858     Dated June 29, 1971

Inventor(s)   Paul H. Ralston

It is certified that error appears in the above-identified patent and that said Letters Patent are hereby corrected as shown below:

Column 2, line 1, "7.5" should read -- 37.5 --. Column 2, line 25, after "I prefer" insert -- a glass having a molar ratio of $K_2O$ to $Na_2O$ of at least --. Column 4, Claim 3, line 28, "in" should read -- an --.

Signed and sealed this 23rd day of May 1972.

(SEAL)
Attest:

EDWARD M. FLETCHER, JR.      ROBERT GOTTSCHALK
Attesting Officer            Commissioner of Patents